United States Patent
Froment et al.

(10) Patent No.: US 9,294,517 B2
(45) Date of Patent: Mar. 22, 2016

(54) CALL SETUP AND CONTROL BY THIRD-PARTY DEVICE

(75) Inventors: Thomas Froment, Longpont sur Orge (FR); Arnaud Ligot, Spy (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1383 days.

(21) Appl. No.: 12/457,365

(22) Filed: Jun. 9, 2009

(65) Prior Publication Data

US 2010/0023627 A1    Jan. 28, 2010

(30) Foreign Application Priority Data

Jul. 25, 2008  (FR) ...................................... 08 55102

(51) Int. Cl.
*G06F 15/16* (2006.01)
*H04L 29/06* (2006.01)

(52) U.S. Cl.
CPC ........ *H04L 65/1069* (2013.01); *H04L 65/1006* (2013.01)

(58) Field of Classification Search
USPC ........................................................ 709/228
See application file for complete search history.

(56) References Cited

U.S. PATENT DOCUMENTS

| | | | | |
|---|---|---|---|---|
| 7,266,591 | B1 * | 9/2007 | Johnston | 709/219 |
| 2003/0177099 | A1 * | 9/2003 | Gallant et al. | 705/52 |
| 2006/0210036 | A1 | 9/2006 | Citron et al. | |
| 2006/0239253 | A1 * | 10/2006 | Gallant et al. | 370/352 |
| 2008/0084868 | A1 * | 4/2008 | Brehm | 370/352 |
| 2008/0225835 | A1 * | 9/2008 | Oda et al. | 370/352 |
| 2009/0225153 | A1 * | 9/2009 | Shibuya et al. | 348/14.13 |
| 2009/0255153 | A1 * | 10/2009 | Mori et al. | 40/107 |
| 2010/0211689 | A1 * | 8/2010 | Bijwaard et al. | 709/228 |

FOREIGN PATENT DOCUMENTS

CN      101 166 105 A    4/2008

OTHER PUBLICATIONS

Rosenberg, J. et al., "Best Current Practices for Third Party Call Control in the Session Initiation Protocol; draft-ietf-sipping-3pcc-05. txt" IETF Standard-Working Draft, Internet Engineering Task Force, IETF, Oct. 27, 2003, vol. sipping, No. 5, XP015027829.

Rosenberg, J. et al., "RFC 3725; Best Current Practices for Third-Party Call Control (3pcc) in the Session Initiation Protocol (SIP)", Internet Citation (Online), Jul. 24, 2007, XP002444155.

* cited by examiner

*Primary Examiner* — Natisha Cox
(74) *Attorney, Agent, or Firm* — Harness, Dickey & Pierce, P.L.C.

(57) ABSTRACT

Method for setting up a communication session (SM) between two communication agents (A, B), triggered by the reception of an event (S) by a third-party communication element (C). Following the reception of this event, the third-party element sends the first of the two agents (A) a signalling message ($M_1$) adapted to cause said agent to send an invitation message ($M_2$) addressed to the second of the two agents (B) and intended to pass via the third-party element (C).

36 Claims, 1 Drawing Sheet

FIG_1
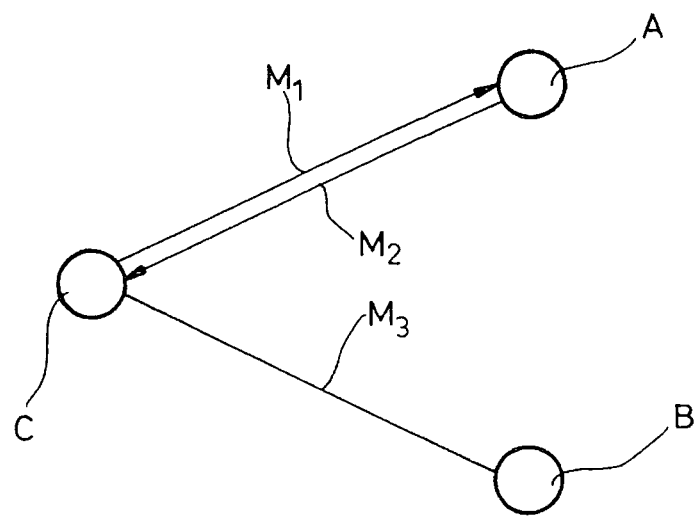
FIG_2
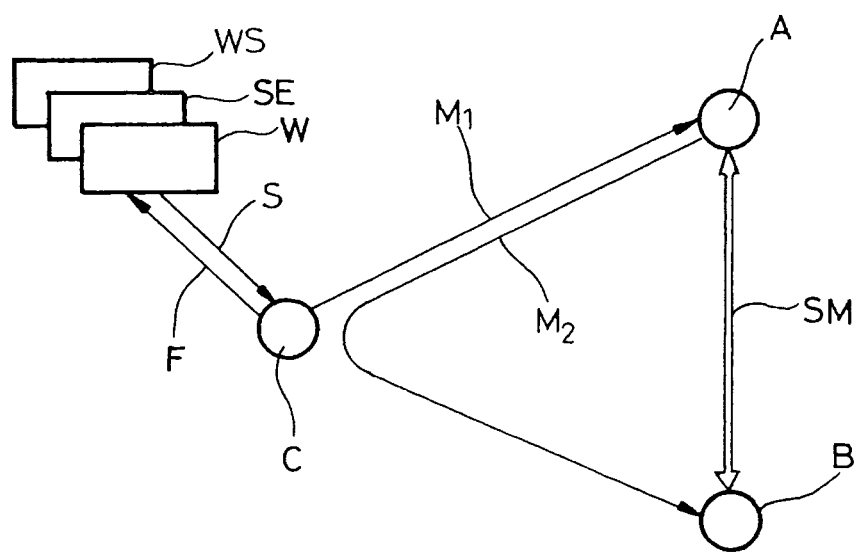

CALL SETUP AND CONTROL BY THIRD-PARTY DEVICE

The present invention relates to the setup and control of calls set up between two communication devices, by a third communication network device.

Such a problem is known to professionals by the acronym 3PCC (Third-party Call Control). It is illustrated in FIG. 1, in which a network device C wishes to trigger the setup of a communication session (or call) between two other devices, A and B. This triggering may itself have been caused by a stimulus received by the network device C, which may be of a different kind.

In modern communication networks, the communication sessions (multimedia or otherwise) are set up by exchanging signaling messages, in particular compliant with the SIP protocol. This protocol is specified by RFC 3261 of the IETF entitled "Session Initiation Protocol".

It is known by professionals to implement the third-party call control (3PCC) on a communication network using the SIP protocol.

The US patent request 2006/0210036 presents such a call control (3PCC). This is however fairly basic and only allows the call to be triggered. Once the communication is set up, control of the call is not possible for the initiator, who can no longer modify it nor end it. Nor can the initiator obtain information on the communication status (in other words be informed of when it ends, its duration, etc.).

This solution also no longer corresponds to the third party call control as defined by RFC 3725.

This RFC 3725 of the IETF is entitled "*Best Current Practices for Third Party Call Control (3pcc) in the Session Initiation Protocol (SIP)*". It describes several solutions which have major disadvantages, and a recommended solution.

However, this recommended solution also has significant disadvantages.

First of all, the document RFC 3725 itself admits that its recommended solution has the disadvantage of creating a situation in which the user of the calling terminal A will hear a long silence before the call is effectively made.

It is possible to counteract this disadvantage by implementing an announcement server which plays on-hold music or an information message. However, this solution requires the deployment of an additional device and makes the call setup process more complex.

Furthermore, the solution recommended by RFC 3725 requires device C to act as a B2BUA ("Back-to-Back User Agent") for the SIP protocol. The disadvantage of such a B2BUA is that it is not very well specified by RFC 3261 and the various works of the IETF. It therefore requires significant specification and development works before being deployed for anything other than simple cases.

RFC 3725 only presents a simple operating scenario, but a more general scenario requires specification of the behavior of device C in several other situations; for example, if the called user has several terminals, or if the session has to interact with other services of the communication network, or in the context of implementation compliant with the standardized IMS (IP Multimedia Subsystem) architecture as specified by the 3GPP and TISPAN bodies which requires a call to be set up using the extensions described in RFC 3262 (in other words the "PRACK" messages) in order to provide guarantees as to the quality of service. Other situations to be taken into account include the renegotiation of the media, cancellations, contradictory situations (what behavior to adopt when the calling party sends a cancellation message, and the called party a renegotiation message?).

In all these cases, the specification works of the state machine managing the SIP protocol within the device C with the potential re-transmissions, error scenarios, etc. are extremely complex and in practice make the solution difficult to use.

Furthermore, the B2BUA type devices require contextual information to be maintained in order to manage the interaction between the multimedia sessions managed. This poses the problem of storing this contextual information in the memory. Firstly large volumes may be represented, requiring significant storage capacities, and secondly, it is essential to provide mechanisms for securing this context information in order to resolve a possible failure of the device C.

Lastly, the solution recommended by the RFC is based on SIP invitation messages "with no offer" (in other words which do not offer any means of setting up the multimedia session). However, these messages are not always correctly supported by the communication devices. The solution proposed may therefore lead to interoperability problems.

For all of these reasons, the solutions set forth by RFC 3725 are not satisfactory.

Another state of the art consists of the document "draft-bhatia-3pcc-refer-01.txt" entitled "*3pcc using the REFER method*".

According to this solution, the controller device C sends agent A a "REFER" type signaling message $M_1$. This signaling message contains a "refer-to" header which indicates the address of the controller device C. In accordance with RFC 3515 which specifies the "REFER" message, on reception, agent A sends an invitation message $M_2$ ("INVITE") to the controller C which can forward it to agent B (message $M_3$).

This solution nonetheless has significant disadvantages.

For controller C to be able to determine that the invitation message $M_2$ is a response to message $M_1$, it must insert a "replace" parameter as indicated in paragraph 4.0 of the document. However, there is relatively little support for this parameter by the communication agents and its use may therefore lead to interoperability problems.

It must also create a context in order to be able to manage the retransmission of the invitation message $M_2$ to agent B, in the event that a session has not previously been set up. This context is specified by the "replace" parameter. This solution therefore poses the same problems relating to the storing of a context in memory as those mentioned previously.

Lastly, the controller C acts, in this solution, as a B2BUA, since specific processing must be implemented to manage the transmission of the invitation message $M_1$ and the convergence of the two calls.

The invention therefore aims to resolve these different problems.

A first objective of the invention is a method for setting up a communication session between two communication agents triggered by the reception of an event by a third-party communication element. This method is innovative in that, following the reception of this event, the third-party element sends the first of said agents a signaling message adapted to cause said agent to send an invitation message addressed to the second of the two agents (B) and intended to pass via the third-party element (C).

According to one embodiment of the invention, the signaling message may be a "REFER" message compliant with the SIP protocol, containing a first information item identifying the second of the agents as the recipient of the invitation message and a second information item identifying the third-party element as an element of the invitation message route.

The first information item may be included in a "Refer-to" header of the signaling message.

The second information item may also be included in the "refer-to" header and distinguished from the first information item by an escape sign, and the third-party element determines the first information item from the header in order to send the invitation message to the second agent. In this case, the third-party element may delete the content of the "refer-to" header starting from the "@" character and replace this escape sign with a "@" character in order to determine the first information item.

According to another implementation of the invention, the second information item may be included in a "refer-route" header of the signaling message.

According to another implementation of the invention, it may be included as a parameter of said "refer-to" header.

The third-party communication element may send return information to the device from which said event originated.

One of the communication agents may be a content server, in particular an announcement server.

The invention also has the aim of a third-party communication element for setting up a communication session between two communication agents on reception of an event. This third-party communication element is characterized in that it is intended to send a first agent a signaling message adapted to cause said agent to send an invitation message addressed to the second agent and intended to pass via said third-party element.

A third aim of the invention is a communication network comprising at least one third-party communication element according to the second aim.

By causing agent A to send an invitation message addressed to agent B and intended to pass via controller C, the invention resolves the technical problem of setting up and controlling a 3pcc session, without causing the disadvantages of the solutions in the state of the art.

In effect, such a message is automatically sent to agent B by controller C without requiring it to store a context in memory. It acts in accordance with the behavior of a "proxy" as defined by RFC 3261. Such a solution is therefore used to overcome both the problems linked to storage in memory of contextual information and problems of implementation of a B2BUA type device.

It may be chosen to use a so-called "stateful" proxy, in other words one which stores in memory the contextual information, but this information then only involves SIP dialog elements and not a complex state machine such as that of a B2BUA type device.

The invention and its benefits will become more clearly apparent in the following description, with reference to the attached figures.

FIG. 1, mentioned previously, represents the state of the art.

FIG. 2 shows in diagram form a communication network implementing the method according to the invention.

The setting up of a communication session between two agents by a third-party element may be triggered by different events or stimuli received on this third-party element. Two examples are illustrated on FIG. 2.

A web server W may present an interface to a user. By interacting with this man-machine interface, the user can cause a stimulus S to be sent to the third-party element C.

For example, the server W may display information relating to a correspondent (a company, an individual, etc.) and by clicking on a given link, users may trigger the sending of this stimulus (or event) in order to ultimately set up a multimedia communication session between their communication terminal and that of the correspondent.

This event may therefore be a message compliant with the HTTP protocol.

The event S can also be a SIP signaling message sent by a signaling element SE such as a "SIP Proxy", a CSCF type functional element compliant with the IMS ("IP Multimedia System") architecture, etc.

The event S may also come from a web service and comply with the SOAP protocol.

This event or stimulus S contains the information required by the signaling element S to determine the parameters of the multimedia session SM to be set up. In particular, this information must identify the two agents A and B between whom it must be set up.

Following reception of this event S, the third-party element C sends a signaling message $M_1$ to the agent concerned as initiator of the multimedia session SM. This agent may be determined by the content of the stimulus S. In the example of FIG. 2, this initiating agent is agent A.

The agents are UAC or UAS agents ("User Agent Client" and "User Agent Serve," respectively) according to the terminology of RFC 3261 of the IETF. It may involve different types of communication terminals (fixed or mobile telephones, computers, personal digital assistants, etc.) or other types of devices which may or may not interact with a user.

It may for example involve an application server or a content server, such as an announcement server.

The signaling message $M_1$ may be implemented in various ways. It may in particular involve a "REFER" signaling message compliant with the SIP protocol. Such a "REFER" message is specified by RFC 3515 of the IETF and has the objective of allowing a call transfer during a communication session by triggering in its receiver the sending of an "Invite" invitation message.

According to this embodiment of the invention, it contains a first information item identifying agent B as the recipient of the invitation message $M_2$, and a second information item identifying the third-party element C as the element of the route via which the invitation message $M_2$ must be sent.

Typically, the first information item may be the physical address or the logical address of the agent B and is included in a "Refer-To" header of the signaling message $M_1$.

In accordance with RFC 3515, the "Refer-To" header is automatically used by the agent A, receiver of the signaling message $M_1$, to construct the invitation message $M_2$. More specifically, the address contained in the "Refer-To" header is used to construct the "To" header of the invitation message $M_2$.

The second information item obliges the invitation message $M_2$ to have the third-party element C in its route. The objective of such a constraint is to allow this third-party element to be informed of all signaling traffic between agents A and B resulting from the signaling message $M_1$. This traffic includes "200 Ok", "Ack", "Ringing" type messages, error messages, termination messages ("Bye"), etc.

This may be necessary in order to send return information F to the device WS, SE, W from which the stimulus S originates.

This information may for example be used to display on a man-machine interface the communication status: "setup", "in progress", "no response", etc., the call duration, etc.

This may also be necessary to allow the third-party device C to control the communication, and in particular to be able to interrupt it. If the called agent is a content server, the control may involve sending a reinvitation message and changes in the configuration of the session (for example a change in the video resolution, etc.).

The second information item, identifying the third-party element, may be included in the signaling message $M_1$ in various ways.

According to a first embodiment, it is included in a "Refer-route" header.

According to the invention, this "refer-route" header is automatically used by agent B to construct the "route" header of the signaling message $M_2$. It should be noted that the "refer-route" name is arbitrary and that the invention concerns any type of new header with the objective of the "refer-route" header explained above.

Since the second information item contains the address (logical or physical) of the third-party device C, the "route" header of the invitation message $M_2$ shall ensure that it must pass via this device.

In accordance with the normal behavior of the SIP protocol, the "route" header is automatically reused by the subsequent messages sent by agent B so that all traffic between the two agents A and B automatically transits via the third-party element C.

Another embodiment of the invention involves including the second information item in the "refer-to" header but distinguishing it from the first information item through the use of an escape sign and such that the invitation message $M_2$ is sent directly to the third-party element C.

The escape sign may for example be a single character, such as "%". The only constraints are that this escape sign must not be found in a logical or physical address, and that overall the content of the "refer-to" header must be grammatically correct and adapted to allow the invitation message $M_2$ to be sent effectively to the third-party element.

The "refer-to" header may then take the form:
Refer-to: <sip:b%db.com@dc.com>

This header is automatically copied to the "To" header of the signaling message $M_2$ sent by agent A. The communication network interprets this header to send it to the element corresponding to the domain "dc.com" in a known manner. It is therefore finally sent to the third-party element C.

This third-party element is adapted to analyze the address sip:b%db.com@dc.com. It deletes the character string starting with the character "@" and replaces the escape sign with this "@" character. The result is the address sip:b@db.com, to which it must send the signaling message $M_2$. This message therefore ends with agent B. The processing applied by the third-party device C does not therefore require any contextual information; it may therefore be a so-called "stateless" proxy.

A third embodiment involves including the second information item as a parameter of the "Refer-To" header. It may therefore be introduced by a previously specified keyword. This keyword is arbitrary and may be "route=".

A "Refer-To" header included in the signaling message $M_1$ may therefore take the form:
Refer-to: <sip:b@dm.com;route=c@dc.com>

This header is automatically used by agent A to construct the signaling message $M_2$ by copying the address sip:b@dm.com to the "To" header and the parameter "c@dc.com" to a "Route" header. In this way, the invitation message $M_2$ is also sent to agent B and to the third-party element C in its route.

On reception of the signaling message $M_2$, agent B may act in accordance with the behavior specified by RFC 3261 and 3515. In particular, through the respect for the route information sent in the invitation message $M_2$, all signaling traffic between agents A and B shall pass via the third-party element C.

The multimedia session SM may also be set up between the two agents.

The third-party element acts as a proxy in these exchanges, as specified by RFC 3261. In particular, no processing is carried out on the sent messages, other than those specified by RFC 3261, and no contextual information is required for sending these messages.

The method according to the invention does not therefore suffer from the disadvantages of the solutions of the state of the art, which are based on B2BUA type devices and on the storage of contextual data in memory.

This is used to send return information F on the status of the multimedia session to the source device of the stimulus or event S.

The invention claimed is:

1. A method for setting up a communication session between two communication agents triggered by reception of an event at a third-party communication element, the method comprising:
sending, by said third-party communication element to a first of said two communication agents, a signaling message configured to cause said first of said two communication agents to send an invitation message addressed to a second of said two communications agents and intended to pass via said third-party communication element, wherein
said signaling message is a "REFER" message compliant with the SIP protocol, containing a first information item identifying said second communication agent as the recipient of said invitation message and a second information item identifying said third-party communication element as an element of the route of said invitation message.

2. The method for setting up a communication session according to claim 1, wherein said first information item is included in a "Refer-to" header of said signaling message.

3. The method for setting up a communication session according to claim 1, wherein said second information item is included in a "refer-to" header, distinguished from said first information item by an escape sign, and wherein said third-party element determines said first information item from said "refer-to" header in order to send said invitation message to said second communication agent.

4. The method for setting up a communication session according to claim 3, wherein said third-party element deletes the content of said "refer-to" header starting from the "@" character and replaces said escape sign with a "@" character in order to determine said first information item.

5. The method for setting up a communication session according to claim 1, wherein said second information item is included in a "refer-route" header of said signaling message.

6. The method for setting up a communication session according to claim 1, wherein said second information item is included as a parameter of a "refer-to" header.

7. The method for setting up a communication session according to claim 1, wherein said third-party communication element sends return information to a device from which said event originates.

8. The method for setting up a communication session according to claim 1, wherein one of said communication agents is a content server.

9. A third-party communication element configured to set up a communication session between two communication agents in response to reception of an event, wherein said third-party communication element is configured to send to a first of said two communication agents a signaling message adapted to cause the first of said two communication agents to send an invitation message addressed to a second of said two communications agents via said third-party communication element, and said signaling message is a "REFER" message compliant with the SIP protocol, containing a first information item identifying said second communication agent as the recipient of said invitation message and a second information item identifying said third-party communication element as an element of the route of said invitation message.

10. The third-party communication element according to claim 9, wherein said first information item is included in a "Refer-to" header of said signaling message.

11. The third-party communication element according to claim 9, wherein said second information item is included in a "refer-to" header, distinguished from said first information item by an escape sign, and wherein said third-party communication element is intended to determine said first information item from said header in order to send said invitation message to said second communication agent.

12. The third-party communication element according to claim 11, wherein the third-party communication element is further configured to delete the content of said "refer-to" header starting from the "@" character and replace said escape sign with a "@" character in order to determine said first information item.

13. The third-party communication element according to claim 9, wherein said second information item is included in a "refer-route" header of said signaling message.

14. The third-party communication element according to claim 10, wherein said second information item is included as a parameter of a "refer-to" header.

15. The third-party communication element according to claim 11, wherein the third-party communication element is further configured to send return information to a device from which said event originates.

16. A communication network comprising at least one third-party communication element according to claim 9.

17. The communication network according to claim 16, wherein one of said communication agents is a content server.

18. A method for setting up a communication session between two communication agents triggered by reception of an event at a third-party communication element, the method comprising:

sending, by said third-party communication element to a first of said two communication agents, a signaling message in response to reception of said event by said third-party communication element; wherein said signaling message designates an intended recipient of an invitation message from said first of said two communication agents, and an intended path for said invitation message, and said signaling message is configured to cause said first of said two communication agents to send said invitation message addressed to a second of said two communications agents via said third-party communication element.

19. The method for setting up a communication session according to claim 18, wherein said signaling message is a "REFER" message compliant with the SIP protocol, containing a first information item identifying said second communication agent as the recipient of said invitation message and a second information item identifying said third-party communication element as an element in the path of said invitation message.

20. The method for setting up a communication session according to claim 19, wherein said first information item is included in a "Refer-to" header of said signaling message.

21. The method for setting up a communication session according to claim 19, wherein said second information item is included in a "refer-to" header, distinguished from said first information item by an escape sign, and wherein said third-party communication element determines said first information item from a "refer-to" header in order to send said invitation message to said second communication agent.

22. The method for setting up a communication session according to claim 21, wherein said third-party communication element deletes the content of said "refer-to" header starting from the "@" character and replaces said escape sign with a "@" character in order to determine said first information item.

23. The method for setting up a communication session according to claim 19, wherein said second information item is included in a "refer-route" header of said signaling message.

24. The method for setting up a communication session according to claim 19, wherein said second information item is included as a parameter of a "refer-to" header.

25. The method for setting up a communication session according to claim 18, wherein said third-party communication element sends return information to a device from which said event originates.

26. The method for setting up a communication session according to claim 18, wherein one of said two communication agents is a content server.

27. A third-party communication element configured to set up a communication session between two communication agents in response to reception of an event, wherein said third-party communication element is configured to send a signaling message to a first of said two communication agents in response to reception of said event by said third-party communication element; wherein said signaling message designates an intended recipient of an invitation message from said first of said two communication agents, and an intended path for said invitation message, and said signaling message is configured to cause said first of said two communication agents to send said invitation message addressed to a second of said two communications agents via said third-party communication element.

28. The third-party communication element according to claim 27, wherein said signaling message is a "REFER" message compliant with the SIP protocol, containing a first information item identifying said second communication agent as the recipient of said invitation message and a second information item identifying said third-party communication element as an element of the intended path of said invitation message.

29. The third-party communication element according to claim 28, wherein said first information item is included in a "Refer-to" header of said signaling message.

30. The third-party communication element according to claim 28, wherein said second information item is included in a "refer-to" header, distinguished from said first information item by an escape sign, and wherein said third-party communication element is intended to determine said first information item from a "refer-to" header in order to send said invitation message to said second communication agent.

31. The third-party communication element according to claim 30, wherein the third-party communication element is further configured to delete the content of said "refer-to"

header starting from the "@" character and replace said escape sign with a "@" character in order to determine said first information item.

32. The third-party communication element according to claim 28, wherein said second information item is included in a "refer-route" header of said signaling message.

33. The third-party communication element according to claim 28, wherein said second information item is included as a parameter of a "refer-to" header.

34. The third-party communication element according to claim 30, wherein the third-party communication element is further configured to send return information to a device from which said event originates.

35. A communication network comprising at least one third-party communication element according to claim 27.

36. The communication network according to claim 35, wherein one of said two communication agents is a content server.

\* \* \* \* \*